United States Patent [19]

Price, Sr. et al.

[11] Patent Number: 4,846,355
[45] Date of Patent: Jul. 11, 1989

[54] HOLDER FOR TAPE CARTRIDGES WITH LOCKING BASE MEMBER

[75] Inventors: Macy J. Price, Sr., Golden; Macy J. Price, Jr., Broomfield; Laurence G. Ball, Denver, all of Colo.

[73] Assignee: Engineered Data Products, Inc., Broomfield, Colo.

[21] Appl. No.: 180,153

[22] Filed: Apr. 11, 1988

[51] Int. Cl.⁴ .............................................. A47F 7/00
[52] U.S. Cl. ...................................... 211/41; 206/387; 312/15
[58] Field of Search .................... 206/387; 211/40, 41; 312/8, 9, 12, 13, 15, 16

[56] References Cited

U.S. PATENT DOCUMENTS

| | | | |
|---|---|---|---|
| 3,866,990 | 2/1975 | McRae | 312/15 |
| 3,969,007 | 7/1976 | Lowry | 312/15 |
| 4,270,817 | 6/1981 | McRae | 312/15 |
| 4,600,107 | 7/1986 | Price et al. | 211/41 |
| 4,730,735 | 3/1988 | Lechner | 211/41 |

FOREIGN PATENT DOCUMENTS 2021072  11/1979  United Kingdom ................ 206/387

Primary Examiner—Bryan Gehman
Attorney, Agent, or Firm—Klaas & Law

[57] ABSTRACT

An integrally molded plastic holder for tape cartridges is provided wherein the holder is partitioned into an upper section and a lower section by two spaced apart ledges integrally formed therewith and wherein the upper and lower sections have a plurality of compartments dimensioned to receive a tape cartridge and wherein a plurality of resiliently tab portions are mounted between the upper and lower ledges so that a portion of each tab portion is located in a recess in a tape cartridge when the tape cartridge has been inserted into one of the compartments to restrain the removal of the tape cartridge from the compartment. The tab portions are mounted so that, when the tab portions are in the recesses, they are in an unstressed condition.

6 Claims, 3 Drawing Sheets

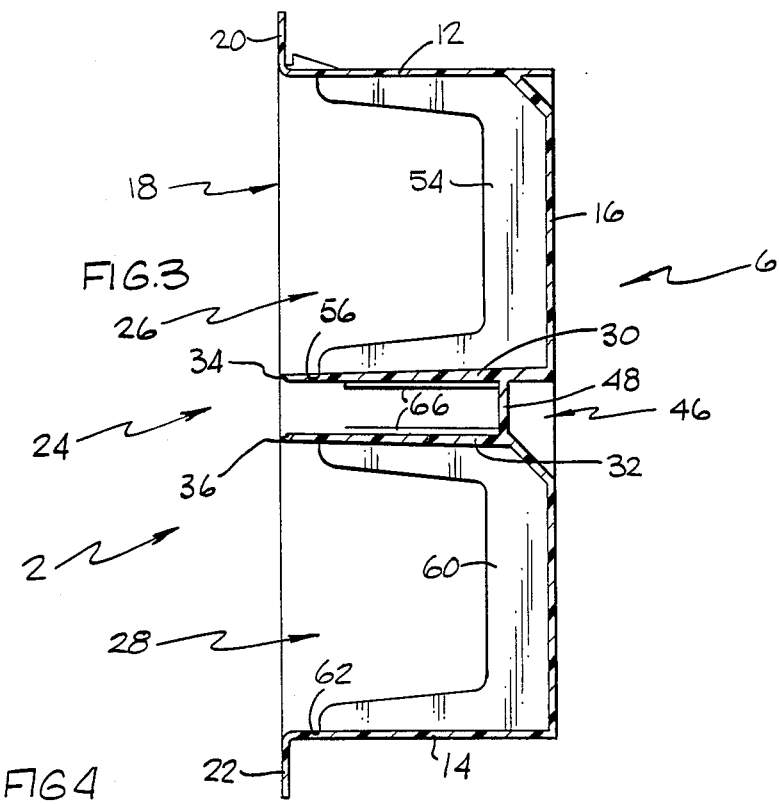
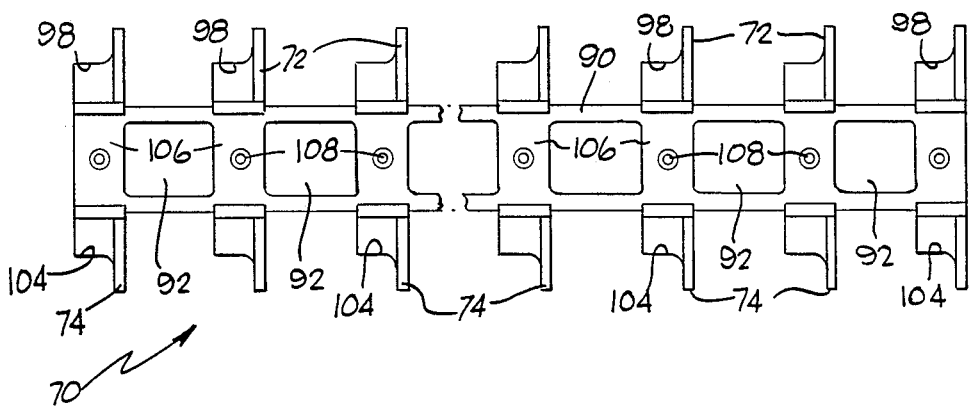
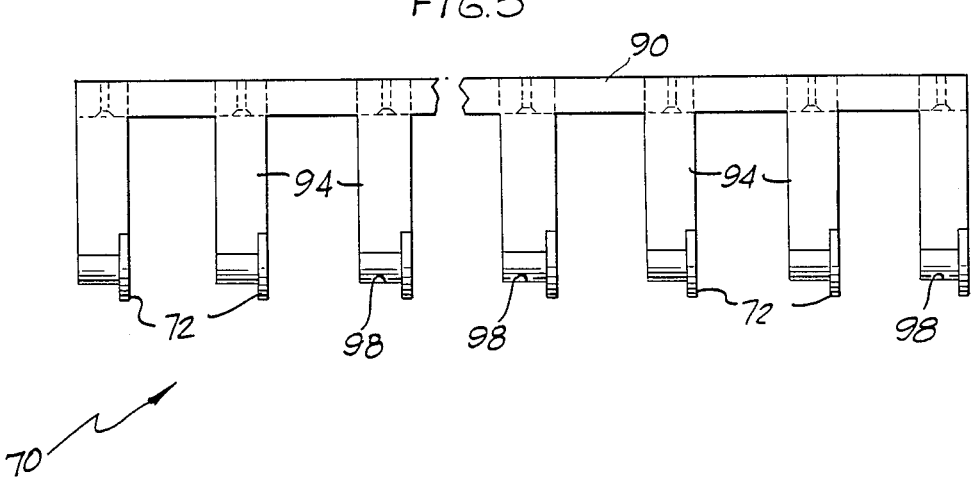

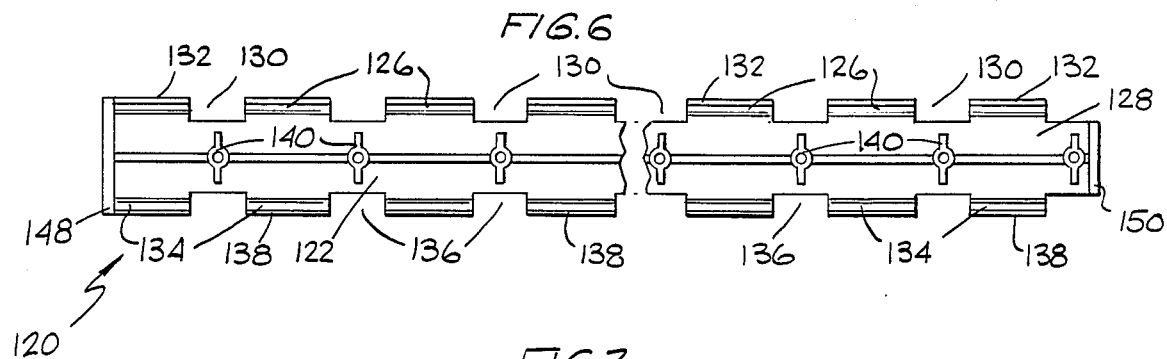
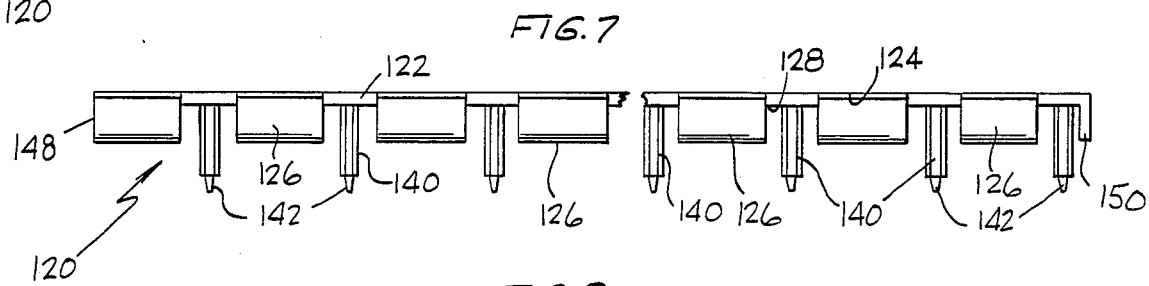
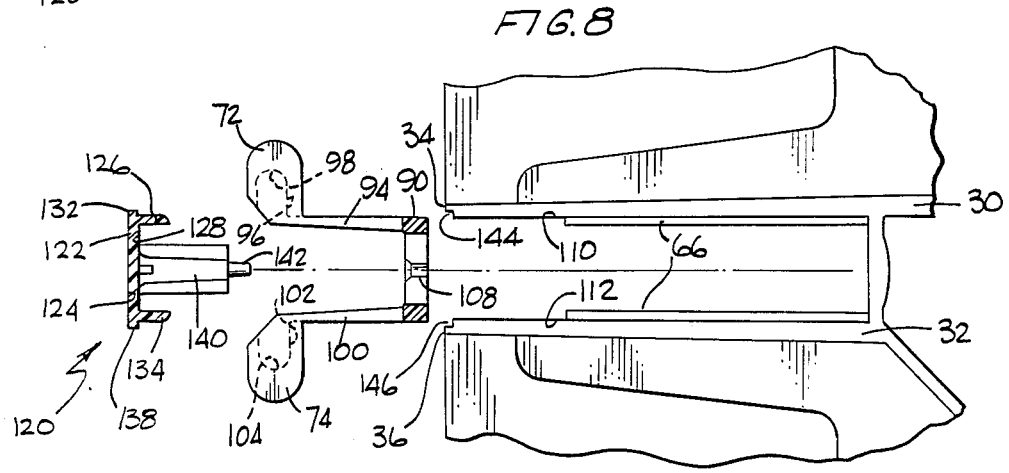
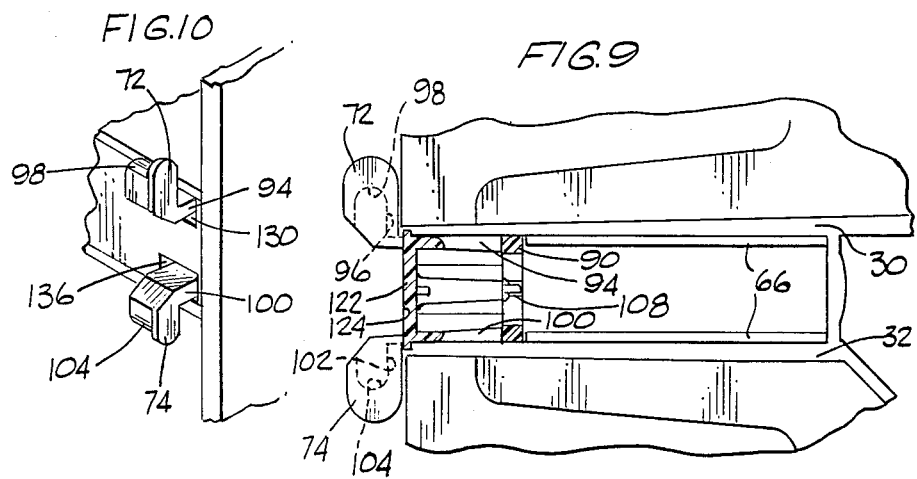

HOLDER FOR TAPE CARTRIDGES WITH LOCKING BASE MEMBER

FIELD OF THE INVENTION

This invention relates generally to holders for tape cartridges used in computer information systems and is particularly directed to holders for tape cartridges used in computer information systems which holders may form a part of a permanent storage system or can be used with transport means for moving the tape cartridges into and out of the permanent storage system.

BACKGROUND OF THE INVENTION

The great increase in the use of computer information systems using tape cartridges has generated the need for an efficient system for the handling of the tape cartridges. Thus, an efficient system requires a holder for a permanent storage system having means for permitting the easy insertion and withdrawal of each tape cartridge and means for ensuring that the tape cartridge remains in position when inserted into the permanent storage system. Also, an efficient system requires a holder that may be used with transport means so that tape cartridges may be removed from the permanent storage system, moved to a distribution center and distributed where required. The holders for use with the transport means require retaining means for ensuring that the tape cartridge remains in the holder during the transportation thereof. A number of holders of tape cartridges have been developed which use some type of resilient means for applying a force to urge the tape cartridges against an abutment means to retain the tape cartridges in the holder. One problem with such type of holders is that the resilient means generally comprises the same type of plastic material from which the holder is made. These resilient means after periods of use tend to lose some or most of their resilient characteristics so that they do not function as well.

BRIEF DESCRIPTION OF THE INVENTION

This invention provides a holder for tape cartridges for use in a permanent storage system or a transport system for moving tape cartridges into and out of the permanent storage system wherein the holder is provided with resilient retaining means for retaining a tape cartridge in a compartment in a holder wherein the resilient retaining means is in an unstressed condition when a tape cartridge is in a compartment in the holder or wherein no tape cartridge is in the compartment in the holder.

In the preferred embodiment of the invention, the holder comprises a housing means integrally molded using a relatively rigid plastic material wherein the housing means has opposite end wall portions, a top wall portion, a bottom wall portion, a back wall portion and an open side so that tape cartridges may be placed into or withdrawn from the housing means. The housing means is provided with partition means for dividing the housing means into upper and lower sections, each having a surface portion on which tape cartridges may be supported and wherein the partition means comprises at least two spaced apart upper and lower ledge means integral with the back wall portion and the opposite end wall portions. Each of the ledge means have a front edge portion. Compartment forming means are provided in each of the upper and lower sections and each compartment is dimensioned to receive one tape cartridge. A plurality of resilient tab means have mounting means for mounting them between the spaced apart upper and lower ledge means so that a portion of each resilient tab means is located in front of the front edge portions of the upper and lower ledge means. Such portion of each resilient tab means is located in a plane located between the upper ledge means and the top wall portion or in a plane located between the lower ledge means and the bottom wall portion so that such portion is displaced as a tape cartridge is inserted into or withdrawn from a compartment. When a tape cartridge is in a compartment, such portion of the resilient tab means is located in a recess in the tape cartridge and is in an unstressed condition but capable of functioning to retain the tape cartridge in the compartment. When no tape cartridge is in a compartment, such portion is in an unstressed condition.

BRIEF DESCRIPTION OF THE DRAWINGS

An illustrative and presently preferred embodiment of the invention is shown in the accompanying drawings in which:

FIG. 3 is a cross-sectional view taken on the line 3-3 of FIG. 2;

FIG. 4 is a front elevational view of the resilient tab means of this invention;

FIG. 5 is a top plan view of FIG. 4;

FIG. 6 is a rear elevational view of the locking means of this invention;

FIG. 7 is a top plan view of FIG. 6;

FIG. 8 is an exploded view with parts in section before the assembly of the resilient tab means and locking means onto the holder;

FIG. 9 is an assembled view of FIG. 8; and

FIG. 10 is an enlarged view of a portion of FIG. 1.

DETAILED DESCRIPTION OF THE INVENTION

Figure 1:
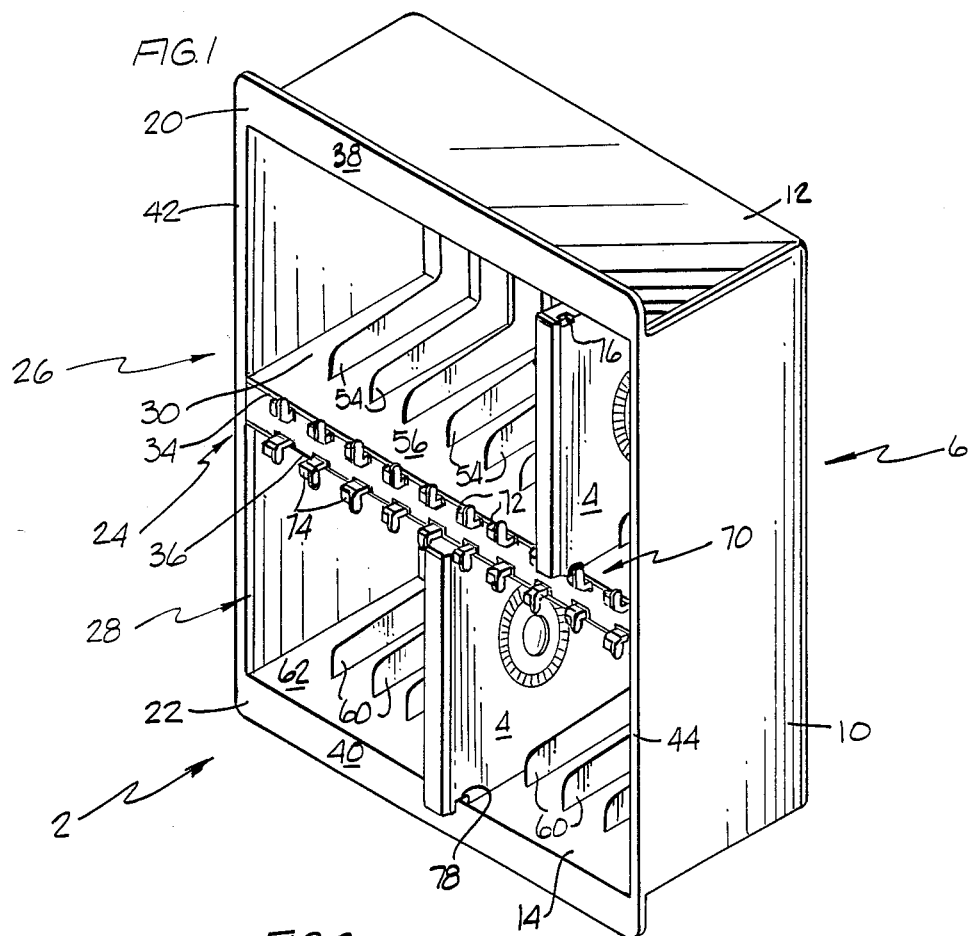
FIG. 1 is a perspective view of a holder for tap cartridges of this invention.
Figure 2:
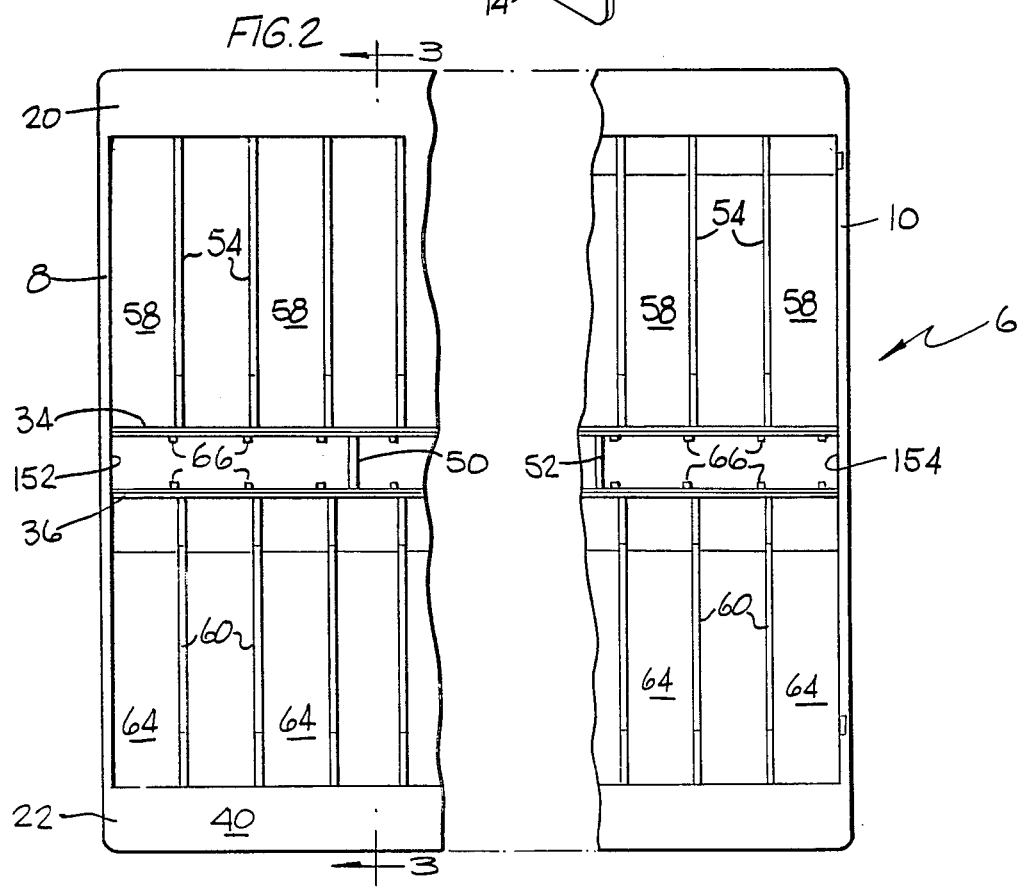
FIG. 2 is a broken away front elevational view of the housing.

A preferred embodiment of the invention is illustrate in FIGS. 1-3 and includes a holder 2 for tape cartridges 4 wherein the holder 2 comprises housing mean 6 integrally molded from a relatively rigid plastic material such as high impact polystyrene or other materials having similar characteristics. The housing means 6 has opposite end wall portions 8 and 10, a top wall portion 12, a bottom wall portion 14, a back wall portion 16 and an open side 18. The housing means 6 has a flange portion 20 extending upwardly from the top wall portion 12 at an angle of about 90 degrees with the top wall portion 12 and a flange portion 22 extending downwardly from the bottom wall portion 14 at an angle of about 90 degrees with the bottom wall portion 14, which flange portions 20 and 22 cooperate to position the holder 2 on shelf means (not shown). A partition means 24 divides the housing means 6 into an upper section 26 and a lower section 28. The partition means comprises an upper ledge means 30 and spaced a distance therefrom a lower ledge means 32, each of which is integral with the back wall portion 16 and the opposite end wall portions 8 and 10. The upper ledge means 30 has a front edge portion 34 and the lower ledge means 32 has a front edge portion 36. The front surfaces 38 and 40 of the flange portions 20 and 22, the front edges 42 and 44 of the opposite end wall portions 8 and 10 and the front edge portions 34 and 36 lie in a common plane. The back wall portion 16 has an inwardly directed recess 46 having a wall portion 48 which serves as a reinforcing means for the upper and lower ledge means 30 and 32. Also, at least two reinforcing beams 50 and 52 integral with the wall portion 48 and the upper and lower ledge means 30 and 32 add additional reinforcement. The upper section 26 is provided with a plurality of compartment forming means 54 which are integral with the top wall portion 12, the back wall portion 16 and the upper surface 56 of the upper ledge means 30 to form a plurality of compartments 58. The lower section 28 is provided with a plurality of compartment forming means 60 which are integral with the lower ledge means 32, the back wall portion 16 and the upper surface 62 of the bottom wall portion 14 to form a plurality of compartments 64. Each of the compartments 58 and 60 is dimensioned to accommodate one tape cartridge 4. A plurality of equal length abutment forming means 66, for purposes described below, are integral with the upper and lower ledge means 30 and 32.

A plurality of resilient tab means 70 are located in front of the front edge portions 34 and 36 of the upper and lower ledge means 30 and 32 and have a plurality of upper tab portions 72 and a plurality of lower tab portions 74. As described below, each of the tab portions 72 and 74 are located so that as a tape cartridge 4 is inserted, into a compartment 58 or 64, the tab portion 72 or 74 will be displaced by the tape cartridge 4 as it is inserted into the compartment 58 or 64 but after the tape cartridge has been inserted into the compartment 58 or 64, the resilient tab means 70 will cause the tab portion 72 or 74 to resile back into its initial position. An upper recess 76 and a lower recess 78 are provided in each tape cartridge 4 and when the tab portions 72 and 74 have resiled back to their initial position, a portion thereof is located in an upper recess 76 or a lower recess 78 to retain the tape cartridge 4 in a compartment 58 or 64 until it is desired to remove such tape cartridge 4 from the compartment 58 or 64.

The resilient tab means 70 is illustrated in FIGS. 4, 5 and 8 -10 and is integrally molded using a relatively rigid plastic material such as an acetal resin such as that marketed by Du Pont under the trade designation Debrin 10 or other materials having similar properties and comprises an elongated base member 90 having a linear extent with a length greater than its width and having a plurality of spaced apart openings 92 formed therein. A plurality of spaced apart upper arms 94 extend outwardly from and are integral with the elongated base member 90 and terminate in the upper tab portions 72 having a vertical planar surface 96 and an arcuate bearing surface 98 over which a portion of the tape cartridge 4 slides as it is inserted into a compartment 58. A plurality of spaced apart lower arms 100 extend outwardly from and ar integral with the elongated base member 90 and terminate in the lower tab portions 74 having a vertical planar surface 102 and an arcuate bearing surface 104 which contacts a portion of the tape cartridge 4 as it is inserted into a compartment 64. The arcuate bearing surface 98 is located in a plane between the upper ledge means 30 and the top wall portion 12 and the arcuate bearing surface 104 is located in a plane between the lower ledge means 32 and the bottom wall portion 14 so that each of the arcuate bearing surfaces 98 or 104 is displaced by a tape cartridge 4 as it is inserted into or withdrawn from a compartment. The portion of each upper tab portion 72 above the arcuate bearing surface 98 and the portion of the lower tab portion 74 below the arcuate bearing surface 104 function to guide a tape cartridge 4 into a compartment 58 or 64. The portions 106 of the elongated base member 90 between the openings 92 are each provided with an opening 108. The width of the elongated base member 90 is substantially the same but slightly less than the distance between the bottom surface 110 of the upper ledge means 30 and the top surface 112 of the lower ledge means 32. The resilient tab means 70 are inserted between the lower surface 110 and the top surface 112 until the elongated base member 9 contacts the abutments 66 as illustrated in FIG. 9.

A locking means 120, illustrated in FIGS. 6 -10, is provided for locking the resilient tab means 70 in position between the upper and lower ledge means 30 and 32. The locking means 120 is integrally molded using a relatively rigid plastic material such as high impact polystyrene or other materials having similar characteristics. The locking means 120 comprises an elongated member 122 having a length greater than its width and a generally planar front surface 124. A plurality of spaced apart upper projections 126 extend outwardly from the rear surface 128 of the elongated member 122 and form a plurality of upper openings 130 therebetween. A plurality of upper flanges 132 extend upwardly from the elongated member 122 in the area of the spaced apart upper projections 126. A plurality of spaced apart lower projections 134 extend outwardly from the rear surface 128 of the elongated member 122 and form a plurality of lower openings 136 therebetween. A plurality of lower flanges 138 extend downwardly from the elongated member 122 in the area of the spaced apart lower projections 134. A plurality of spaced apart studs 140 extend outwardly from the rear surface 128 of the elongated member 122 and terminate with plug portions 142 which are located so as to fit into the openings 108 As illustrated in FIG. 8, an upper recess 144 is formed in the front edge 34 and a lower recess 146 is formed in the front edge 36.

The assembly of the resilient tab means 70 and the locking means 120 in the housing means 6 is illustrated in FIG. 9. The resilient tab means 70 has been inserted between the upper and lower ledge means 30 and 32 until the elongated base member 90 contacts the abutment forming means 66. The locking means 120 has a flange portion 148 and a flange portion 150 which guide the locking means 120 during assembly by contacting the inner surface 152 of the side wall portion 8 and the inner surface 154 of the side wall portion 10 so that the locking mean 120 is positioned with the upper tab portions 72 in the upper openings 130 and the lower tab portions 74 in the lower openings 136. The locking means 120 is moved inwardly until the upper flanges 132 are in contact with the walls defining the upper recess 144 and the lower flanges 138 are in contact with the walls defining the upper recess 146. Suitable means, such as ultrasonic welding, are used to secure the upper and lower flanges 132 and 138 to the upper and lower ledges 30 and 32.

When it is desired to insert a tape cartridge 4 into an upper compartment 58, the lower portion thereof contacts the arcuate surface 98 of an upper tab portion 72 and pushes it downwardly into the recess 130. The tape cartridge 4 is then moved into the upper compartment 58 by sliding over the arcuate surface 98. When the lower recess 78 of the tape cartridge 4 is over the upper tab portion 72, the resilient characteristics of the upper tab portion 72 will move it into the lower recess 78. The upper tab portion 72 is constructed so that it will move into the lower recess 78 but will not put any upward pressure on the tape cartridge 4 but will be located so that the vertical surface of the lower recess 78 is opposite to the vertical planar surface 96 of the upper tab portion 72 to restrict movement of the tape cartridge 4 out of the compartment 58. When the tape cartridge 4 is seated on the upper surface 56, there is sufficient clearance between the top of the tape cartridge 4 and the bottom of the top wall portion 12 so that when it is desired to remove the tape cartridge 4 from the compartment 58, the tape cartridge is tilted upwardly so that the edge of the lower recess 78 will contact the arcuate bearing surface 98 and move the upper tab portion 72 into the recess 130 so that the tape cartridge 4 may be removed. The insertion of a tape cartridge 4 into a compartment 64 in the lower section 28 is similar to the operation described above with the upper portion of the tape cartridge 4 contacting the arcuate surface 104 and pushing the lower tab portion 74 up into the recess 136 until tape cartridge 4 reaches a position at which the upper recess 76 is beneath the lower tab portion 74 so that it can move into the upper recess 76 so that a vertical surface of the upper recess 76 is opposite to the vertical planar surface 102 so as to restrict movement of the tape cartridge 4 out of the compartment 64. There is sufficient clearance so that the tape cartridge 4 can be tilted downwardly so that the edge of the upper recess 76 will contact the arcuate bearing surface 104 and move the lower tab portion into the recess 136 so that the tape cartridge 4 may be removed.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A holder for tape cartridges comprising:
   housing means integrally molded using a relatively rigid plastic material and having at least one open side so that tape cartridges may be placed into or withdrawn from said housing;
   said housing means having opposite end wall portions, a top wall portion, a bottom wall portion and a back wall portion;
   said housing means having partition means extending between said opposite end wall portions and dividing said housing means into an upper section and a lower section;
   said partition means having a front edge portion forming a pat of said upper section and a front edge portion forming a part of said lower section;
   each of said upper and lower sections having a surface portion on which said tape cartridges may be supported;
   compartment forming means in each of said upper and lower sections, each of said compartment forming means forming a plurality of compartments, each having dimensions adapted to receive one tape cartridge therein;
   a plurality of resilient tab means located in front of said front edge portion of said upper portion and in front of said front edge portion of said lower section and having portions thereof in alignment with each of said compartments;
   each of said resilient tab means having at least a portion located in a plane between said upper ledge means and said top wall portion and at least a portion located in a plane between said lower ledge means and said bottom wall portion so that each of said portions is displaced by said tape cartridge as it is inserted into or withdrawn form said compartment;
   each of said resilient tab means having said at least a portion thereof located in a recess in each of said tape cartridges when in said compartment so as to retain each of said tape cartridges in each of said compartments;
   wherein said partition means comprises:
   at least two spaced apart upper and lower ledge means extending inwardly from and integral with said back wall portion and said opposite side wall portions;
   said front edge portions being located on said upper and lower ledge means;
   mounting means for mounting said resilient tab means between said upper and lower ledge means;
   said upper ledge means having a generally planar upper surface extending generally in a horizontal direction;
   said lower ledge means having a generally planar lower surface extending generally in a horizontal direction;
   said mounting means locating said resilient tab means so that each of said resilient tab means has an upper portion extending above said generally planar upper surface and a lower portion extending below said generally planar lower surface so that each of said portions may be recieved in a recess in said tape cartridge;
   locking means for locking said plurality of resilient tab means and said mounting means therefore in position between said upper and lower ledge means; and
   an elongated base member extending generally in a linear direction and having an upper portion and a lower portion when mounted to extend generally in a horizontal direction;
   a plurality of spaced apart upper arms extending outwardly from and integral with said upper portion of said base member;
   a tab portion on the extremity of each of said upper arms and projecting vertically upwardly therefrom;
   a plurality of spaced apart lower arms extending outwardly from and integral with said lower portion of said base member;
   a tab portion on the extremity of each said lower arms and projecting vertically downwardly therefrom; and
   said elongated base member and said upper and lower arms being formed from a relatively rigid plastic material having a characteristic of resiling back to an initial position so that if said upper arms are moved toward said lower arms or said lower arms are moved toward said upper arms when a force is applied thereto, said upper and lower arms will resile to their initial position when said force is removed.

2. The invention as is claim 1 and further comprising:

a recess formed in each of said front edge portions of said upper and lower ledges to form spaced apart abutments;

said locking means comprising an elongated member having upper and lower flanges; and said upper and lower flanges of said licking means being secured to said spaced apart abutments.

3. The invention as is claim 2 and further comprising:

each of said tab portions having a surface to be contacted by said tape cartridge as said tape cartridge is inserted into one of said compartments; and movement permitting means in said locking means for permitting movement of said upper arms toward said lower arms and of said lower arms toward said upper arms as said tape cartridge is inserted into one of said compartments.

4. The invention as in claim 3 wherein:

said surface on each of said tab portions is an arcuate bearing surface for contacting a generally linear surface of said tape cartridge so as to generate only a minimum amount of frictional force as said tape cartridge is slid over said arcuate bearing surface into each of said compartments with a portion of said tab portion being located in said recess in said tape cartridge.

5. The invention as in claim 4 wherein:

each of said upper and lower arms being in said initial position when said portions of said tab portions thereof are located in said recesses.

6. The invention as in claim 4 wherein:

said tape cartridge when seated in said compartment exerts no force in a vertical direction on said tab portion.

* * * * *